Figure 1:
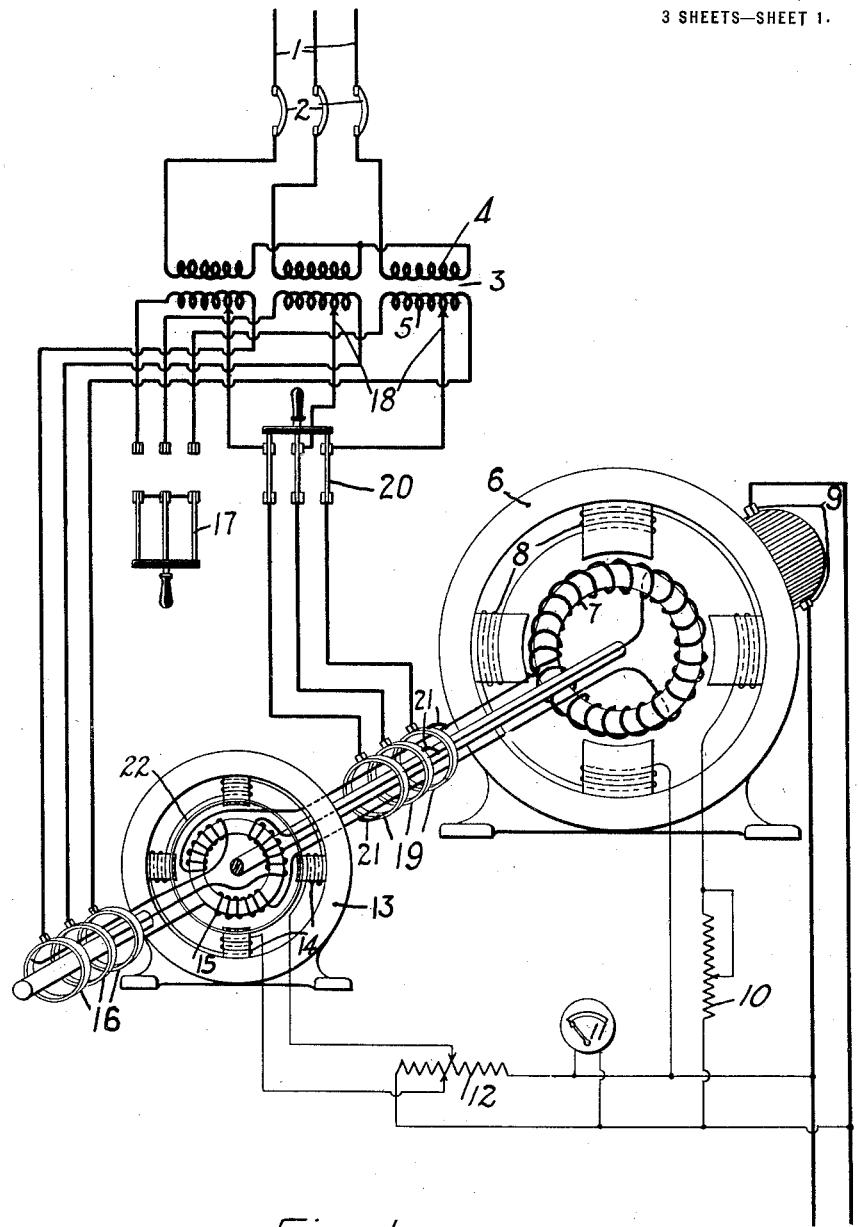

E. ROSENBERG.
APPARATUS FOR STARTING SYNCHRONOUS MACHINES.
APPLICATION FILED MAR. 24, 1915.

1,318,696.

Patented Oct. 14, 1919.

3 SHEETS—SHEET 1.

WITNESSES:
Fred H. Miller
O. W. Kennedy

INVENTOR
Emanuel Rosenberg
BY
ATTORNEY

UNITED STATES PATENT OFFICE.

EMANUEL ROSENBERG, OF BOWDON, ENGLAND, ASSIGNOR TO WESTINGHOUSE ELECTRIC AND MANUFACTURING COMPANY, A CORPORATION OF PENNSYLVANIA.

APPARATUS FOR STARTING SYNCHRONOUS MACHINES.

1,318,696.     Specification of Letters Patent.     Patented Oct. 14, 1919.

Application filed March 24, 1915. Serial No. 16,818.

*To all whom it may concern:*

Be it known that I, EMANUEL ROSENBERG, a subject of the Emperor of Austria, and a resident of Bowdon, in the county of Chester, England, have invented a new and useful Improvement in Apparatus for Starting Synchronous Machines, of which the following is a specification.

My invention relates to rotary converters which are provided with boosters, and it has for its object to provide an improved method or arrangement for starting such machines from the alternating current side.

In a copending application, Serial No. 761,415 filed April 16, 1913 by me and assigned to the Westinghouse Electric & Manufacturing Company, which issued July 3, 1917, as Patent No. 1,231,651, I have described an arrangement for starting and obtaining a self-synchronizing action of rotary converters provided with alternating current boosters in which the booster has a separate starting winding and in which the starting current circulates through the rotary converter during the starting period.

According to my present invention, I provide means for starting such combined machines without the necessity of providing any additional winding on the booster and without passing the alternating current from the line through the rotary converter during the starting period. In carrying out the invention, the transformers through which energy from the source of supply is conveyed to the converter are provided with taps which, for starting, are connected to the armature windings of the booster to impress thereon a suitable voltage that shall be either lower than or equal to or even higher than the normal booster voltage. The booster armature windings may be disconnected entirely from, or remain connected to, certain points of the rotary converter armature windings, but the connection to the transformer windings is carried out in such a manner, that, during the starting period, the current passes through the booster windings only. These windings now act like the primary winding of an ordinary squirrel-cage induction motor, the secondary winding being either the unexcited field or the pole shoes or damper windings provided on or in the pole shoes. The field winding may either be short-circuited on itself or may be connected to the direct-current brushes of the rotary converter through suitable resistances and, in the latter case, some alternating current would also flow through the armature of the rotary converter but this would be so small as to be negligible. The current in the booster armature will be large and may even be considerably higher than the normal full-load current. Since this current does not enter the rotary converter armature, there is no disturbance at the direct-current brushes of the rotary converter, and the polarity of the rotary converter field is not affected. As the speed increases, the rotary converter is able to excite itself as a direct current machine, and current may be taken from the direct-current brushes to excite the booster field to insure that the booster will finally synchronize with the supply current and cause a proper phase relation to obtain between the rotary converter and the supply. When synchronism of the booster is reached, the voltage of the rotary converter may be adjusted to the correct value, and, as the rotary is already in synchronism, it is possible to close those switches which impress full voltage upon the terminals of the combined rotary converter and booster machine and to open other switches which connect one terminal of each booster phase to the starting tap of the transformer winding.

Figure 2:
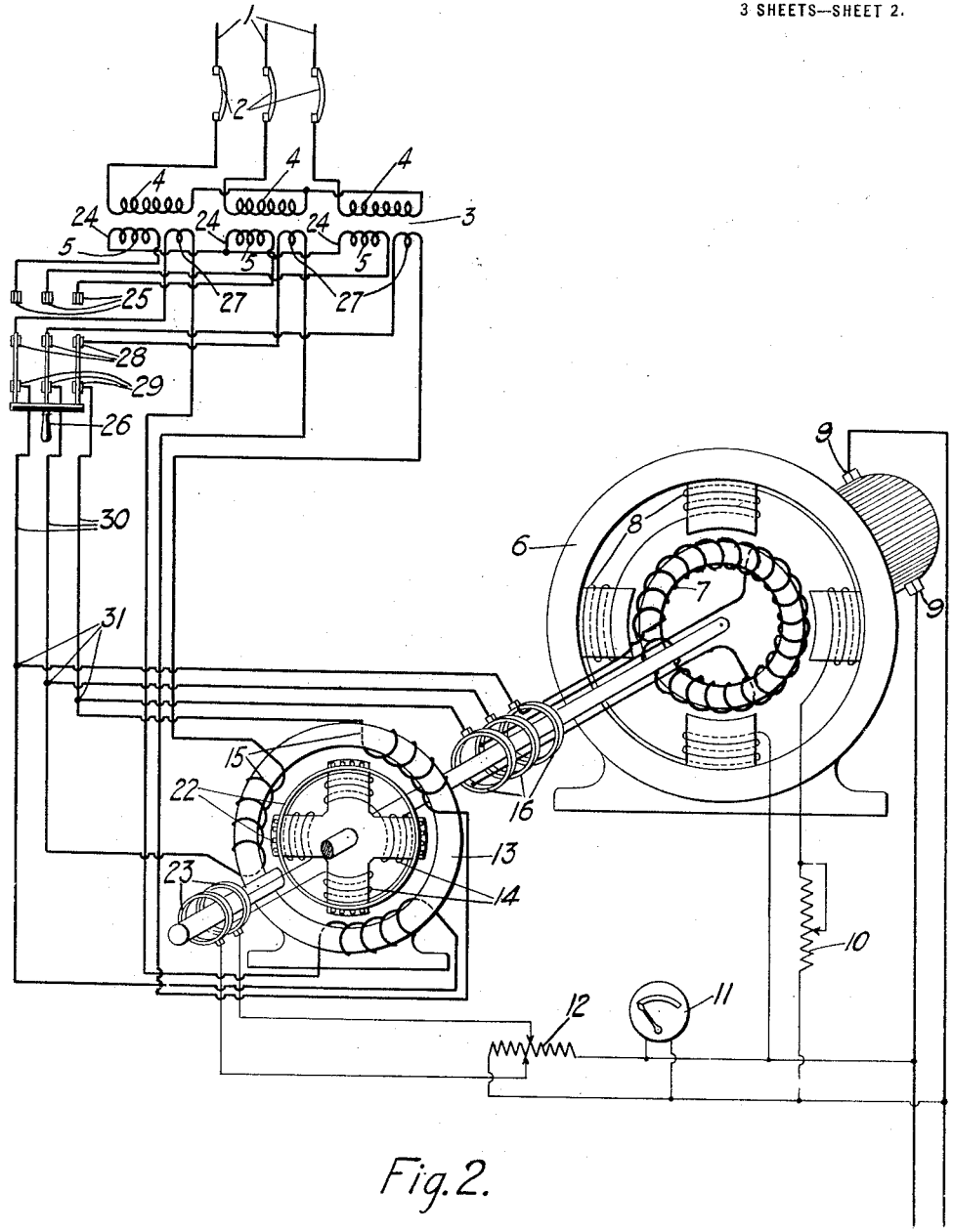
Figure 3:
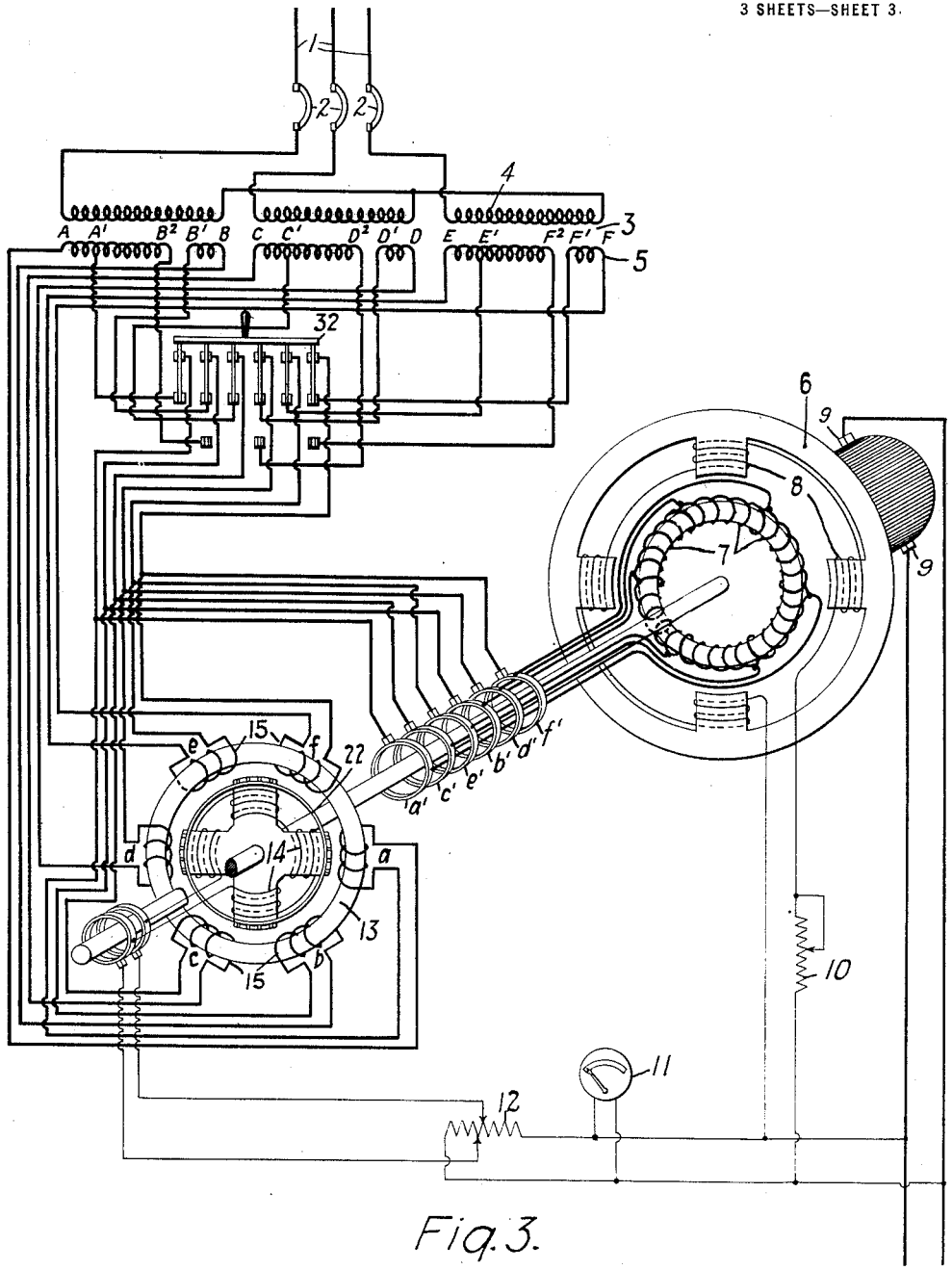

In the accompanying drawings, Figure 1 is a diagrammatic view showing connections, according to my invention, as applied to a three-phase rotary converter coupled to a three-phase booster having a stationary field and a rotating armature; Fig. 2 is a diagrammatic view showing connections, according to my invention, as applied to a three-phase rotary converter coupled to a three-phase booster having a rotating field and stationary armature; and Fig. 3 is a diagrammatic view showing connections, according to my invention, as applied to a six-phase rotary converter coupled to a six-phase booster having a rotating field and stationary armature.

In all of the figures the usual high-tension supply mains 1 and switch 2 are connected to a step-down transformer 3 comprising a primary winding 4 and a secondary winding 5. A rotary converter 6, comprising rotating armature and stationary field magnet members provided with armature windings 7 and field magnet windings 8, is here shown as excited from the direct-current terminals 9 of the armature, the regulation of the field being obtained by a rheostat 10 in the usual way. A voltmeter 11 is provided for reading the direction and value of the direct-current voltage of the rotary converter. A potentiometer type of rheostat 12 is connected across the direct-current terminals 9 by means of which the booster field magnet windings 8 may be excited and the excitation varied from zero to certain positive and negative values.

Referring now particularly to Fig. 1, an alternating current booster 13, comprising stationary field magnet and rotating armature members, is provided with field magnet windings 14 and armature windings 15 the terminals of which are connected to slip rings 16. The left hand terminals of each of the secondary windings 5 of the step-down transformer 3 are connected to a three-pole single-throw switch 17 which, when closed, connects the secondary windings 5 of the transformer in star. The other terminals of the secondary windings 5 of the transformer 3 are respectively connected to one terminal of each of the armature windings 15 of the booster 13 the other terminals of the booster armature windings 15 being connected to the armature windings 7 of the rotary converter 6 in the usual manner. Taps are provided at suitable points 18 on the secondary windings 5 of the transformer 3 and are connected to a second set of slip rings 19 that are disposed between the rotary converter 6 and the booster 13, through a three-pole single-throw switch 20, hereinafter referred to as the starting switch. The slip rings 19 are severally connected to the leads between the rotary converter and booster armature windings 7 and 15 at the points 21.

For starting the rotary, the switch 17 is opened and the switch 20 is closed, as shown. Although, by this procedure, each of the armature windings 7 of the rotary converter 6 is electrically connected to one tap 18 of the secondary transformer windings 5, there will be substantially no current flowing through the armature windings of the rotary converter because the three transformer taps 18 belong to different windings which have no electrical connection inside the transformer, so long as the switch 17 remains open. With the switch 17 open and the switch 20 closed and considering, for the moment, only one of the secondary phase windings 5 of the transformer 3, the right hand terminal of the same is connected to one phase winding 15 of the booster armature and the other end of said armature winding is connected, through the connection 21, the slip ring 19 and the switch 20, to the intermediate point 18 in the secondary winding 5 of the transformer 3. The other secondary windings of the transformer and of the booster armature are respectively similarly connected. The armature windings 15 of the booster 13 will thus have a voltage impressed upon them from portions of the secondary windings 5 of the transformer 3 which will cause them to act like the primary windings of a squirrel-cage induction motor, the secondary winding being the surface of the field magnet poles and the field magnet windings 14 of the booster 13 or the damper winding 22 provided in the pole faces. When synchronous speed has been reached, the switch 20 is opened and the switch 17 closed, whereupon the secondary windings 5 of the transformer 3 are connected in star and the full voltage of the secondary will be impressed upon the armature windings 7 of the rotary through the booster armature windings 15 in the usual way.

Fig. 2 shows a slightly different arrangement. In this case the booster 13 comprises stationary armature and rotating field magnet members, the field magnet windings 14 being connected to the potentiometer type of rheostat 12 through the slip rings 23. The armature windings 15 of the booster 13 are connected to the armature windings 7 of the rotary converter 6 through slip rings 16, in the usual manner. The left hand terminals of the main portions 24 of the secondary windings 5 of the step-down transformer 3 are permanently connected in star, as shown, the other terminals of the said main portions 24 of the transformer windings being connected to the fixed contact members 25 of a three-pole double-throw switch 26. Those portions 27 of the secondary windings 5 of the transformer 3, which are tapped off for starting purposes, are severally connected between one terminal of each of the armature windings 15 of the booster 13 and the movable member 28 of the double-throw switch 26. The remaining terminals of the armature windings 15 of the booster 13 are connected to the other fixed contact members 29 of the double-throw switch 26, as shown by means of the leads 30 which tap off between the armature windings 15 and the slip rings 16 at the points 31.

When starting, the movable member 28 of the switch 26 is connected to the lower set of fixed contact members 29, as shown, whereupon the armature windings 15 of the booster are connected to the tapped off portions 27 of the secondary windings 5 of the step-down transformer 3. After synchronous speed has been attained the switch 26 is thrown to its upper position so that the movable member 28 makes contact with the fixed contact members 25, whereupon the armature windings 15 of the booster 13 and of the rotary 6 will be supplied with the full voltage of the secondary windings 5 of the transformer 3.

Fig. 3 shows a starting arrangement for a six-phase rotary converter coupled to a six-phase booster. In this arrangement, it will be observed that the three phases of the secondary windings 5 of the transformer 3 have no star or other connection in the transformer itself. The end terminals A, B, C, D, E and F are connected respectively to one terminal of each of the six armature windings 15 of the booster 13. Every phase, however, has, apart from its end terminals (A and B in the transformer phase shown on the left hand side of the figure) three other taps brought out (A', B' and B²) which are connected to certain of the contact members of a six-pole double-throw change-over switch 32, as shown. The six movable members of this switch are connected to the transformer taps A', B', C', D', E' and F', respectively, and, when in the starting position, as shown in the drawing, will make connection with the upper contact members which are in electrical connection with one terminal of each of the six booster armature windings $a$, $b$, $c$, $d$, $e$, and $f$ and the slip rings $a'$, $b'$, $c'$, $d'$, $e'$ and $f'$ of the rotary converter. Thus, at starting, a reduced voltage will be impressed upon the respective booster armature windings 15.

In the running position of the switch 32, all these connections will be broken and connections between taps B' and B² and similarly between taps D' and D², F' and F² will be established. In the running position, therefore, a circuit is established from the complete phase winding AB of the transformer secondary 5 through one booster armature winding ($a$) to the slip ring $a'$ and through another of the booster armature windings $b$ to the slip ring $b'$, equivalent circuits being also established for the other two phase windings of the transformer secondary 5. In the case of a six-phase rotary coupled to a three-phase booster during starting, three of the slip rings of the rotary converter may be disconnected from the supply source and the machine started in the same way as a three-phase rotary converter, as described above with reference to Fig. 1 or Fig. 2 of the drawings or according to some modification of the connections therein shown.

While I have shown my invention as applied in the several arrangements, in a simple and preferred form, it is not so limited but is susceptible of such modifications of structure and arrangement of parts as may come within the scope of the appended claims.

I claim as my invention:

1. In an electric circuit, the combination with a synchronous dynamo-electric machine and a second dynamo-electric machine mechanically and electrically connected thereto, of means for impressing a given voltage upon the second dynamo-electric machine for accelerating it to synchronism and further means for impressing an increased voltage upon both of said machines without interrupting the electrical connection therebetween.

2. In an electric circuit, the combination with a synchronous dynamo-electric machine and a second dynamo-electric machine mechanically associated therewith and permanently connected thereto, in series circuit relation, of means for impressing a given voltage upon the second dynamo-electric machine for accelerating it to synchronism and further means for impressing an increased voltage upon both of said machines.

3. The combination with a synchronous-booster rotary converter, of a supply transformer therefor, switching means whereby a portion only of the secondary winding of said transformer may be connected to energize solely the booster machine, and other switching means, whereby the entire converter aggregate may be connected to be energized by a different portion of said transformer secondary winding through said booster machine.

4. The combination with a synchronous-booster rotary converter comprising a booster machine provided with a phase-wound armature and a field system embodying definite field windings and damping conductors, of a supply transformer therefor, switching means whereby a portion of the secondary winding of said transformer may be connected to energize solely the armature winding of said booster machine and the definite field windings of said booster machine may be connected to the direct current terminals of the rotary converter proper, and other switching means whereby the entire converter aggregate may be connected to be energized by another portion of said transformer secondary winding through said booster machine.

In testimony whereof I have hereunto subscribed my name this 24th day of February, 1915.

EMANUEL ROSENBERG.

Witnesses:
  R. HORAH,
  M. TAYLOR.